US 7,822,238 B2

(12) United States Patent
Bolle et al.

(10) Patent No.: US 7,822,238 B2
(45) Date of Patent: *Oct. 26, 2010

(54) METHOD, SYSTEM, AND PROGRAM PRODUCT FOR TRANSFORMING A BIOMETRIC IMAGE

(75) Inventors: Rudolf M. Bolle, Bedford Hills, NY (US); Sharat S. Chikkerur, Cambridge, MA (US); Jonathan H. Connell, Cortlandt Manor, NY (US); Nalini K. Ratha, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/146,487

(22) Filed: Jun. 26, 2008

(65) Prior Publication Data
US 2008/0285815 A1 Nov. 20, 2008

Related U.S. Application Data

(63) Continuation of application No. 11/384,984, filed on Mar. 20, 2006.

(51) Int. Cl.
*G06K 9/00* (2006.01)

(52) U.S. Cl. ..................................................... 382/124
(58) Field of Classification Search ........................ None
See application file for complete search history.

(56) References Cited

U.S. PATENT DOCUMENTS 6,580,804 B1    6/2003    Abe
6,836,554 B1 *  12/2004   Bolle et al. ................. 382/116
2001/0030759 A1 10/2001  Hayashi et al.
2004/0052400 A1  3/2004   Inomata et al.
2005/0063562 A1 * 3/2005  Brunk et al. ................ 382/100

OTHER PUBLICATIONS

Bolle et al., U.S. Appl. No. 11/384,984, filed Mar. 20, 2006, Office Action Summary, Jun. 16, 2009, 10 pages.
Bolle et al., U.S. Appl. No. 11/384,984, Office Action Communication, Dec. 31, 2009, 12 pages.
Bolle et al., U.S. Appl. No. 12/146,487, filed Jun. 26, 2008, Office Action Summary, Jun. 10, 2009, 18 pages.
Application No. EP 06 819 404. 2-1522, Office Action Communication, Jan. 25, 2010, 5 pgs.
Application No. EP 06 819 404.2-1522, Response to Office Action Communication, May 6, 2010, 2 pgs.

* cited by examiner

*Primary Examiner*—Samir A. Ahmed
*Assistant Examiner*—Fred Hu
(74) *Attorney, Agent, or Firm*—Preston J. Young; Hoffman Warnick LLC

(57) ABSTRACT

The invention provides a method, system, and program product for transforming a multi-dimensional biometric feature point set. More particularly, the invention provides a method for transforming a biometric image using surface folding of the image. In one embodiment, the invention provides a method for transforming a multi-dimensional biometric feature point set, the method comprising: converting the multi-dimensional biometric feature point set to a canonical position and orientation; applying a non-invertible transform function to each of a plurality of points of the biometric feature point set; and providing a transformed biometric feature point set comprising a plurality of transformed points.

15 Claims, 4 Drawing Sheets

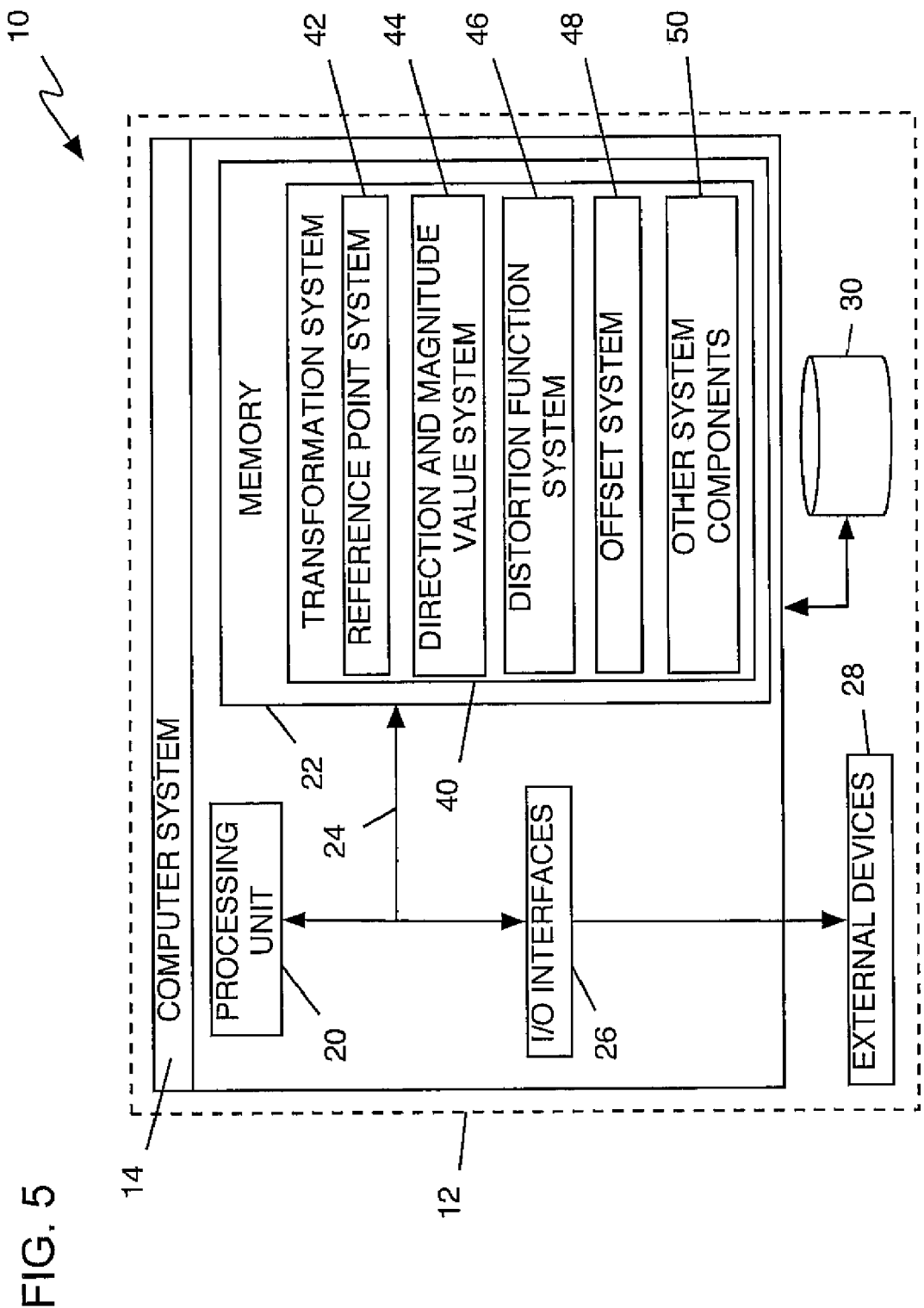

METHOD, SYSTEM, AND PROGRAM PRODUCT FOR TRANSFORMING A BIOMETRIC IMAGE

CROSS-REFERENCE TO RELATED APPLICATIONS

This application is a continuation of co-pending U.S. patent application Ser. No. 11/384,984, filed 20 Mar. 2006, which is hereby incorporated by reference.

BACKGROUND OF THE INVENTION

1. Technical Field

The invention relates generally to biometrics, and more particularly, to a method, system, and program product for transforming a biometric image using surface folding.

2. Background Art

Ensuring the privacy of personally-identifiable information is a growing concern in today's society. Traditional authentication techniques primarily utilize tokens or depend on some secret knowledge possessed by a user for verifying his or her identity. While such techniques have been popular, they suffer from a number of limitations. Neither token- nor knowledge-based techniques can differentiate between an authorized user and a person having access to an authorized user's token or password. In addition, knowledge-based techniques may require a user to manage multiple identities (user names, passwords, etc.), limiting the usefulness of such techniques.

Biometric authentication and identification techniques based on a user's physical characteristics (e.g., fingerprints, facial characteristics, retinal pattern, etc.) overcome the limitations of token- and knowledge-based techniques. As a result, biometric-based techniques are rapidly replacing token- and knowledge-based techniques. However, biometric-based authentication and identification techniques suffer from their own deficiencies.

First, biometric data are secure, but not secret. That is, while biometric data may be unique and inextricably linked to an individual, some biometrics, such as a voice, facial characteristics, signature, or fingerprint, may be intercepted in transmission or mined from a database and subsequently misused by someone other than the individual.

Second, biometric data cannot be revoked or cancelled. Unlike a token or password, which may be revoked, reset, replaced, etc. in the event that it is lost or otherwise compromised, biometric data are fixed. As a result, once compromised, biometric data cannot reliably be used to authenticate or identify the individual.

Third, biometric data may be used to track or otherwise observe an individual without his or her consent. For example, if the same biometric, such as a fingerprint, is used by more than one agency, application, or location, it may be possible to track an individual's movements, transactions, etc. by sharing biometric data between agencies, applications, or locations.

In an attempt to overcome these deficiencies, U.S. Pat. No. 6,836,554 to Bolle et al. describes a method for distorting a biometric, permitting use of the distorted biometric rather than the original, undistorted biometric. In the event that the distorted biometric is compromised, it can be revoked and a new distorted biometric produced using a distortion algorithm different than was used to produce the first distorted biometric. However, the distorted fingerprint approach taught by Bolle et al. comprises scrambled blocks of the undistorted fingerprint. As a consequence, a slight change in the position of a point of interest in the undistorted biometric may result in the point of interest being located in different blocks in the distorted fingerprint. This makes it difficult or impossible for an authentication device to identify an individual based on a distorted biometric stored in an authentication database. In addition, it may be possible to reconstruct the undistorted biometric from a fingerprint distorted according to the Bolle et al. block permutation method, thereby jeopardizing the security of the original biometric.

To this extent, a need exists for a biometric-based authentication system and method that does not suffer from the deficiencies of known systems and methods.

SUMMARY OF THE INVENTION

The invention provides a method, system, and program product for transforming a multi-dimensional biometric feature point set. More particularly, the invention provides a method for transforming a biometric image using surface folding of the image from which these points are derived.

A first aspect of the invention provides a method for transforming a multi-dimensional biometric feature point set, the method comprising: converting the multi-dimensional biometric feature point set to a canonical position and orientation; applying a non-invertible transform function to each of a plurality of points of the biometric feature point set; and providing a transformed biometric feature point set comprising a plurality of transformed points.

A second aspect of the invention provides a system for transforming a multi-dimensional biometric feature point set, the system comprising: a system for converting the multi-dimensional biometric feature point set to a canonical position and orientation; a system for applying a non-invertible transform function to each of a plurality of points of the biometric feature point set; and a system for providing a transformed biometric feature point set comprising a plurality of transformed points.

A third aspect of the invention provides a program product stored on a computer-readable medium, which when executed, transforms a multi-dimensional biometric feature point set, the program product comprising: program code for converting the multi-dimensional biometric feature point set to a canonical position and orientation; program code for applying a non-invertible transform function to each of a plurality of points of the biometric feature point set; and program code for providing a transformed biometric feature point set comprising a plurality of transformed points.

A fourth aspect of the invention provides a method for deploying an application for transforming a multi-dimensional biometric feature point set, comprising: providing a computer infrastructure being operable to: convert the multi-dimensional biometric feature point set to a canonical position and orientation; apply a non-invertible transform function to each of a plurality of points of the biometric feature point set; and provide a transformed biometric feature point set comprising a plurality of transformed points.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which:

FIG. 5 shows a block diagram of an illustrative system according to the invention.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION

As indicated above, the invention provides a method, system, and program product for transforming a biometric image. More particularly, the invention provides a method, system, and program product for transforming a multi-dimensional biometric feature point set by, inter alia, applying a non-invertible transform function to each of a plurality of points in the multi-dimensional biometric feature point set.

While described herein with reference to a fingerprint image, the invention is applicable to the transformation of any number of biometric images or multi-dimensional biometric feature point sets, such as a facial image or a signature. For example, in a facial image the inner and outer corners of the eyes, the tip of the nose, the bottom of the chin, etc. may be taken as the biometric feature points. For a signature, the top of each loop, the position of each pen direction reversal, and the location of each baseline crossing may be taken as the biometric feature points. Preferably, the biometric image is two-dimensional, although three-dimensional biometric images may also be transformed according to the invention (e.g., the 3D position of the tip of the nose, chin, etc. as determined from a 3D facial image).

Figure 1A:
FIGS. 1A-D show the transformation of a biometric image according to an embodiment of the invention.
Figure 1B:

Turning now to the figures, FIGS. 1A-D show various views of a fingerprint image during transformation according to one embodiment of the invention. FIG. 1A shows a fingerprint image 100 suitable for transformation according to the invention. In FIG. 1B, a reference point (i.e., a core 110) is identified on the fingerprint image 100. Preferably, at least one reference point is identified. Where the image is a fingerprint, as in FIG. 1B, suitable reference points include, for example, a core 110 or a delta 120.

In addition, a plurality of feature points 122, 123 are identified and the position of each feature point defined relative to the position of at least one reference point 110. This reference point does not necessarily have to be one of the feature points. The number of feature points identified will vary based on the type, quality, and size of the image. Where the image is a fingerprint, preferably between about 30 and about 80 feature points are identified. These are commonly referred to as minutia points and consist of fingerprint ridge endings and ridge bifurcations.

Figure 1C:
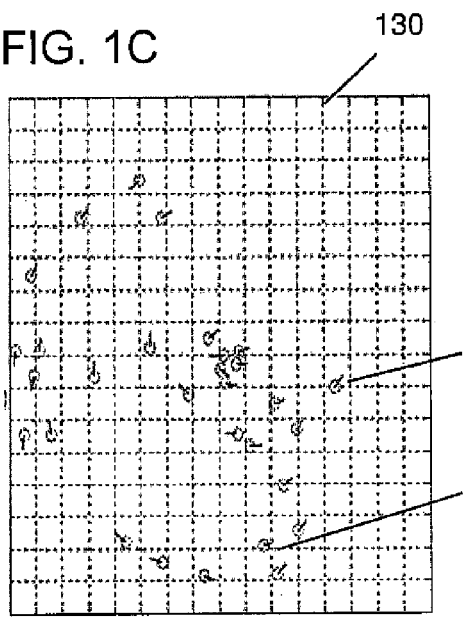
Figure 1D:
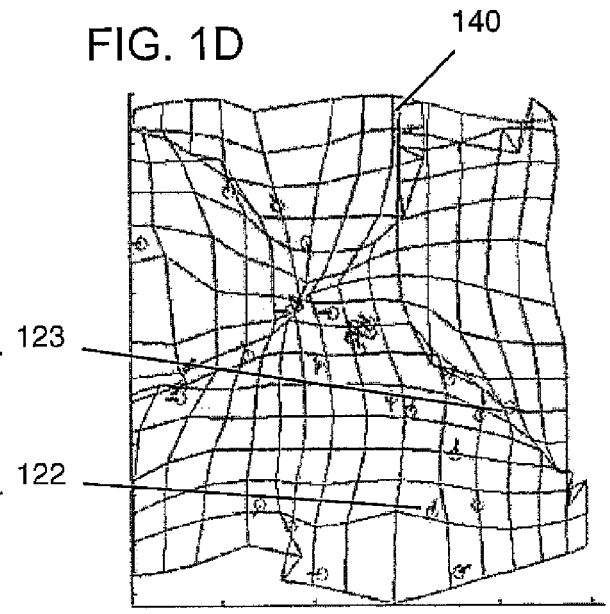

In FIGS. 1C-D, the fingerprint image has been removed and feature points 122, 123 are shown in relation to reference grid 130, 140 respectively. The removal of the fingerprint image 100 in FIGS. 1C-D is for the purpose of description and simplicity. In reality, feature points 122, 123 remain disposed in relation to the fingerprint image 100.

In order to affect a transformation according to the invention, each feature point in FIG. 1B is converted to a canonical position and orientation in FIG. 1C. This is done by rigidly rotating and translating the whole set of biometric feature points 122, 123. The translation parameters are chosen so that one or more of the reference points 110, 120 ends up in a standard location. The rotation parameter is chosen to align a reference orientation based on image properties with one of the coordinate axes. A preferred method is to rotate the whole point set so that the reflectional symmetry axis of the ridge flow pattern around the core 110 is vertical. Another preferred method is to rotate the whole point set so that the line connecting the core 110 and delta 120 is at 45 degrees.

In FIG. 1C, feature points 122, 123 are shown in relation to untransformed reference point grid 130. In FIG. 1D, the positions of feature points 122, 123 are transformed from those shown in FIG. 1C. In order to better show the transformed position of feature points 122, 123, each is shown in relation to a transformed reference grid 140. As can be seen in FIG. 1D, the transformation of feature points 122, 123 resembles a folding of the surface of transformed reference grid 130 to give reference grid 140.

The relative horizontal and/or vertical positions of feature points 122, 123 may be reversed in their untransformed and transformed states, as though the surface of reference grid 130 was folded like a sheet of paper. Notice also that several parts of the original grid 130 may map to the same portion of the distorted image in FIG. 1D, such as the fold that occurs in the upper right hand corner. Ambiguities such as this guarantee that the distortion is non-invertible—there is no way to know which of the original grid squares in FIG. 1C a point in this region came from.

Figure 2A:
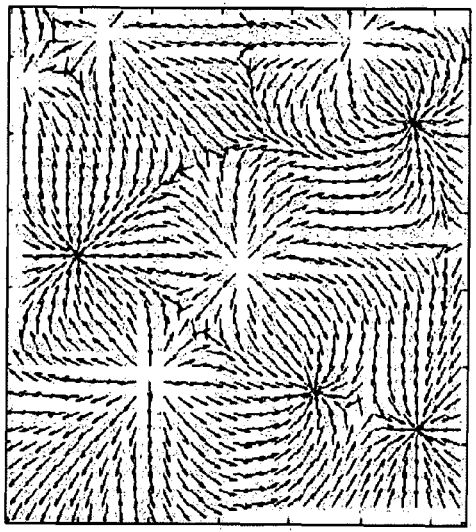
FIGS. 2A-B show a random distribution of charges.
Figure 2B:
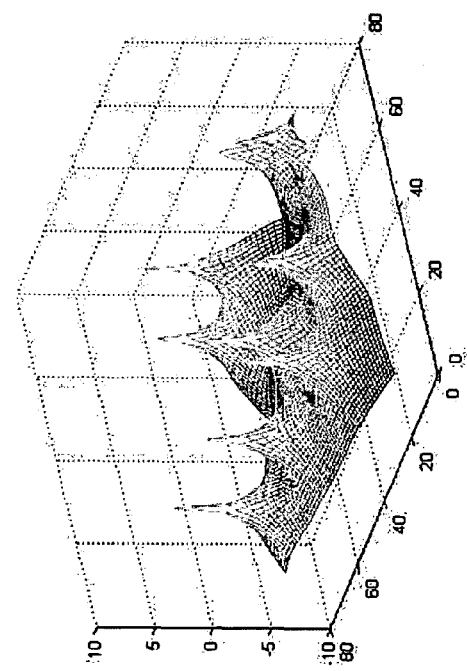
Figure 3A:
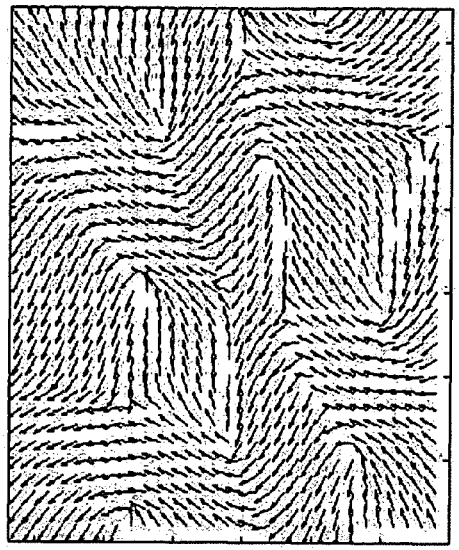
FIGS. 3A-B show a mixture of Gaussian kernels.
Figure 3B:
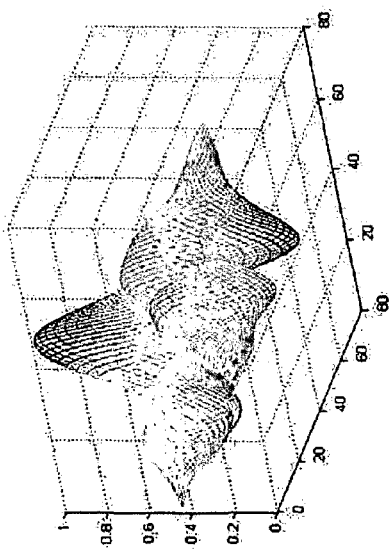

One or more feature points may be transformed according to the invention by adding an offset vector to the feature point's untransformed position. An offset is computed from a distortion function, which, in turn, is calculated from a direction value and a magnitude value. Direction and magnitude values may be based on, for example, a random distribution of point charges, a mixture of Gaussian kernels, or a pole-zero model. For example, FIG. 2A shows a three-dimensional representation of a random distribution of charges, while FIG. 2B shows the associated two-dimensional gradient vectors. Similarly, FIG. 3A shows a three-dimensional representation of a mixture of Gaussian kernels, while FIG. 3B shows the associated two-dimensional gradient vectors.

From functions such as those in FIGS. 2A-3B, transformational direction and magnitude values may be set. For example, using the random charge distribution of FIG. 2B, a magnitude value may be set according to the equation:

$$F(z) = \sum_{i=1}^{K} \frac{q_i}{|(z-z_i)|^3},$$

Here F is the height of the function in FIG. 2A which can be computed based on the canonical position of the input biometric feature point z=(x, y) and a random transformation key $[z_1, z_2, \ldots z_K, q_1, q_2, \ldots q_K]$ describing the position and magnitude of the K charges.

Similarly, a direction value may be set according to the equation below which finds a unit vector in the direction of the gradient shown in FIG. 2B:

$$\Phi_{x,y}(z) = \nabla \left( \sum_{i=1}^{K} \frac{q_i}{|(z-z_i)|^3} \right)$$

The new coordinates of a point become z'=(x', y')=(x+F(z)$\Phi_x$(z), y+F(z)$\Phi_y$(z)).

Alternatively, using the mixture of Gaussian kernels shown in FIG. 3B, a magnitude value may be set according to the equation:

$$F(z) = \sum_{i=1}^{K} \frac{w_i}{|2\pi \Lambda_i|} e^{-\frac{(z-\mu_i)^T \Lambda^{-1}(z-\mu_i)}{2}}$$

wherein the random transformation key defines the parameter of the distributions such as the weights w, covariances □, and centers □ of the K kernels. Similarly, a direction value may be set according to the equation:

$$\Phi_{x,y}(z) = \nabla F(z) + \Phi_{rand}(z),$$

wherein $\Phi_{rand}$ is a random phase offset also based on the biometric feature point's position z. Note that the same random function would be used each time and that the seed for the random number generator would become part of the transformation key.

Direction and magnitude values may be determined according to the same or different functions. For example, the direction value may be set according to a random distribution of charges, and the magnitude value set according to a mixture of Gaussian kernels. Alternatively, the values may be determined according to, for example, two different mixtures of Gaussian kernels.

A preferred embodiment of the invention includes a transformation utilizing 24 Gaussians, each with the same isotropic standard deviation of 50 pixels. The centers of the Gaussians are placed randomly and each given a peak magnitude of +1 or −1. The additive superposition of all functions is then taken to generate the function F(z). Preferably, two such surfaces are generated, one to choose the direction in which each feature point will be moved by finding the orientation of the local gradient and the second to choose a magnitude for the transformation of each feature point. Also, each feature point is moved in the defined direction by at least a minimum move of 30 pixels.

Figure 4:
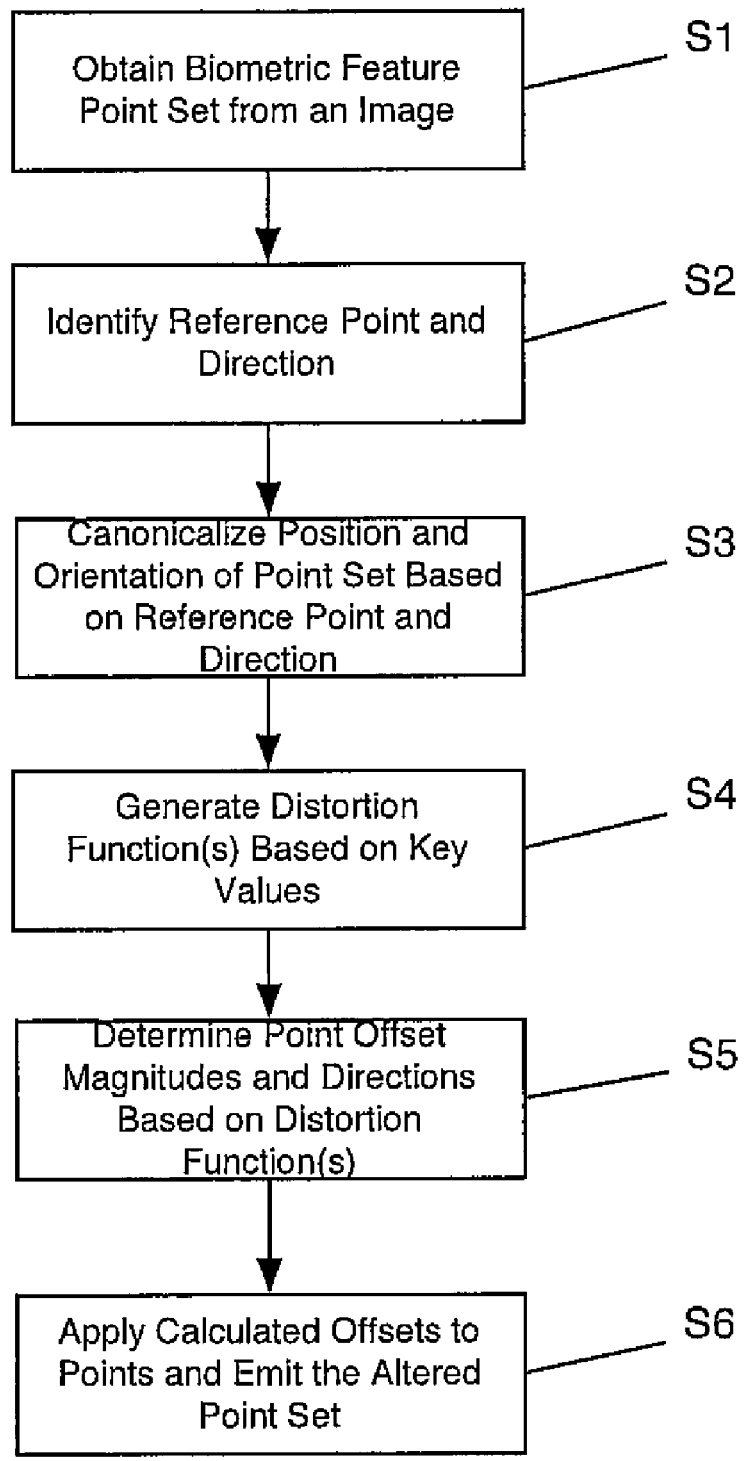
FIG. 4 shows a flow diagram of an illustrative method according to the invention.

Referring now to FIG. 4, a flow diagram of an illustrative method for transforming a biometric image according to the invention is shown. In step S1, a set of distinguished biometric feature points is extracted from the biometric image to represent the identity of an individual. As noted above, the biometric image is preferably a two-dimensional biometric image, such as a fingerprint image. At step S2, at least one reference point and at least one reference orientation is identified on the biometric image. At step S3, the point set is rotated and translated based on the reference point and reference orientation such that it is in a "canonical" coordinate frame. Next, at step S4, an overall non-invertible distortion function is calculated based on a provided key containing the relevant transform parameters. This distortion function may be based on one or more individual sub-functions. At step S5, the distortion function is used to calculate a direction and magnitude for offsetting each of the biometric feature points. Finally, in step S6 the resulting offset vectors are applied to the points to produce a new, transformed set of biometric feature points.

A biometric image transformed according to the invention does not suffer from the deficiencies of known methods. For example, in the case that a transformed biometric according to the invention is compromised, it may be cancelled, revoked, or otherwise deactivated and a new transformed biometric produced simply by altering one or more of the parameters contained in the distortion key. When transformed with a suitably different set of parameters, the resulting point set does not match with either the original point set or with the version of the set resulting from the previous transform.

In addition, because transformation methods according to the invention permit the production of a nearly limitless number of transformed biometrics, different parameters (keys) may be used by each individual. Even for the same individual, these parameters (keys) may be different for each authentication or identification system with which the user may interact. As a consequence, the transformed biometric image utilized by each such authentication or identification system will be unique, eliminating the possibility that such systems may be combined or otherwise communicate in an attempt to track a user's movements, transactions, etc. without the user's consent.

Finally, the non-invertibility of the transformed biometric images of the present invention makes it extremely difficult or impossible to reconstruct the original, untransformed biometric image. This is a significant advancement over known methods, greatly improving both the security of biometric authentication and identification systems, and the willingness of individuals to utilize them.

FIG. 5 shows an illustrative system 10 for transforming a biometric image. To this extent, system 10 includes a computer infrastructure 12 that can perform the various process steps described herein for transforming a biometric image. In particular, computer infrastructure 12 is shown including a computer system 14 that comprises a transformation system 40, which enables computer system 14 to transform a biometric image by performing the process steps of the invention.

Computer system 14 is shown including a processing unit 20, a memory 22, input/output (I/O) interfaces 26, and a bus 24. Further, computer system 14 is shown in communication with external devices 28 and a storage system 30. As is known in the art, in general, processing unit 20 executes computer program code, such as transformation system 40, that is stored in memory 22 and/or storage system 30. While executing computer program code, processing unit 20 can read and/or write data from/to memory 22, storage system 30, and/or I/O interface 26. Bus 24 provides a communication link between each of the components in computer system 14. External devices 28 can comprise any device that enables a user (not shown) to interact with computer system 14 or any device that enables computer system 14 to communicate with one or more other computer systems.

In any event, computer system 14 can comprise any general purpose computing article of manufacture capable of executing computer program code installed by a user (e.g., a personal computer, server, handheld device, etc.). However, it is understood that computer system 14 and transformation system 40 are only representative of various possible computer systems that may perform the various process steps of the invention. To this extent, in other embodiments, computer system 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 12 is only illustrative of various types of computer infrastructures for implementing the invention. For example, in one embodiment, computer infrastructure 12 comprises two or more computer systems (e.g., a server cluster) that communicate over any type of wired and/or wireless communications link, such as a network, a shared memory, or the like, to perform the various process steps of the invention. When the communications link comprises a network, the network can comprise any combination of one or more types of networks (e.g., the Internet, a wide area network, a local area network, a virtual private network, etc.). Regardless, communications between the computer systems may utilize any combination of various types of transmission techniques.

As previously mentioned, transformation system 40 enables computer system 14 to transform a biometric image. To this extent, transformation system 40 is shown including a reference point system 42, a direction and magnitude value system 44, a distortion function system 46, and an offset system 48. Operation of each of these systems is discussed above. Transformation system 40 may further include other system components 50 to provide additional or improved functionality to transformation system 40. It is understood that some of the various systems shown in FIG. 5 can be implemented independently, combined, and/or stored in memory for one or more separate computer systems 14 that communicate over a network. Further, it is understood that some of the systems and/or functionality may not be implemented, or additional systems and/or functionality may be included as part of system 10.

While shown and described herein as a method and system for transforming a biometric image, it is understood that the invention further provides various alternative embodiments. For example, in one embodiment, the invention provides a computer-readable medium that includes computer program code to enable a computer infrastructure to transform a biometric image. To this extent, the computer-readable medium includes program code, such as transformation system 40, that implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computer system, such as memory 22 and/or storage system 30 (e.g., a fixed disk, a read-only memory, a random access memory, a cache memory, etc.).

In another embodiment, the invention provides a business method that performs the process steps of the invention on a subscription, advertising, and/or fee basis. That is, a service provider could offer to transform a biometric image as described above. In this case, the service provider can create, maintain, support, etc., a computer infrastructure, such as computer infrastructure 12, that performs the process steps of the invention for one or more customers. In return, the service provider can receive payment from the customer(s) under a subscription and/or fee agreement and/or the service provider can receive payment from the sale of advertising space to one or more third parties.

In still another embodiment, the invention provides a method of generating a system for transforming a biometric image. In this case, a computer infrastructure, such as computer infrastructure 12, can be obtained (e.g., created, maintained, having made available to, etc.) and one or more systems for performing the process steps of the invention can be obtained (e.g., created, purchased, used, modified, etc.) and deployed to the computer infrastructure. To this extent, the deployment of each system can comprise one or more of (1) installing program code on a computer system, such as computer system 14, from a computer-readable medium; (2) adding one or more computer systems to the computer infrastructure; and (3) incorporating and/or modifying one or more existing systems of the computer infrastructure, to enable the computer infrastructure to perform the process steps of the invention.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. To this extent, program code can be embodied as one or more types of program products, such as an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for transforming a multi-dimensional biometric feature point set, the method comprising:
converting the multi-dimensional biometric feature point set to a canonical position and orientation;
applying a non-invertible transform function to individual points of a plurality of points of the biometric feature point set using a computing device, the non-invertible transform function including a point offset direction as a first transform and a point offset amount as a second transform; and
providing a transformed biometric feature point set comprising a plurality of transformed points,
wherein the point offset direction and the point offset amount are separately applied to the individual points.

2. The method of claim 1, further comprising:
applying the non-invertible transform function to at least one additional orientation of the individual points.

3. The method of claim 1, wherein the multi-dimensional biometric feature point set is selected from a group consisting of: a fingerprint, a facial image, and a signature.

4. The method of claim 1, wherein converting includes:
determining a reference point and a reference orientation.

5. The method of claim 4, wherein the reference point includes a core of a fingerprint and the reference orientation includes an orientation of the core of the fingerprint.

6. The method of claim 4, wherein the reference orientation includes a direction between a core of a fingerprint and a delta of a fingerprint.

7. The method of claim 1, wherein the non-invertible transform function includes a mixture of Gaussian kernels.

8. The method of claim 1, wherein the non-invertible transform function includes a point potential function.

9. A system for transforming a multi-dimensional biometric feature point set, the system comprising:
at least one computing device including:
a system for converting the multi-dimensional biometric feature point set to a canonical position and orientation;
a system for applying a non-invertible transform function to individual points of a plurality of points of the biometric feature point set, the non-invertible transform function including a point offset direction as a first transform and a point offset amount as a second transform, wherein the point offset direction and the point offset amount are separately applied to the individual points; and a system for providing a transformed biometric feature point set comprising a plurality of transformed points.

10. The system of claim 9, wherein the at least one computing device further includes:

a system for applying the non-invertible transform function to at least one additional orientation of the individual points.

11. The system of claim 9, wherein the multi-dimensional biometric feature point set is selected from a group consisting of: a fingerprint, a facial image, and a signature.

12. The system of claim 9, wherein the system for converting includes:

a system for determining a reference point and a reference orientation, wherein the reference point includes a core of a fingerprint and the reference orientation includes one of: an orientation of the core of the fingerprint and a direction between the core of the fingerprint and a delta of the fingerprint.

13. A program product stored on a computer-readable storage medium, which when executed, transforms a multi-dimensional biometric feature point set, the program product comprising:

program code for converting the multi-dimensional biometric feature point set to a canonical position and orientation;

program code for applying a non-invertible transform function to individual points of a plurality of points of the biometric feature point set, the non-invertible transform function including a point offset direction as a first transform and a point offset amount as a second transform, wherein the point offset direction and the point offset amount are separately applied to the individual points; and program code for providing a transformed biometric feature point set comprising a plurality of transformed points.

14. The program product of claim 13, wherein the biometric feature point set is selected from a group consisting of: a fingerprint, a facial image, and a signature.

15. A method for deploying an application for transforming a multi-dimensional biometric feature point set, comprising:

providing a computer infrastructure being operable to:

convert the multi-dimensional biometric feature point set to a canonical position and orientation;

apply a non-invertible transform function to individual points of a plurality of points of the biometric feature point set, the non-invertible transform function including a point offset direction as a first transform and a point offset amount as a second transform, wherein the point offset direction and the point offset amount are separately applied to the individual points; and provide a transformed biometric feature point set comprising a plurality of transformed points.

* * * * *